(12) United States Patent
Wang et al.

(10) Patent No.: US 10,999,702 B2
(45) Date of Patent: May 4, 2021

(54) METHOD FOR MANAGING WIRELESS SYSTEM AREA, TERMINAL AND BASE STATION

(71) Applicant: CHINA ACADEMY OF TELECOMMUNICATIONS TECHNOLOGY, Beijing (CN)

(72) Inventors: Ying Wang, Beijing (CN); Pierre Bertrand, Beijing (CN); Wei Bao, Beijing (CN); Jiamin Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 171 days.

(21) Appl. No.: 16/321,419

(22) PCT Filed: Jul. 5, 2017

(86) PCT No.: PCT/CN2017/091782
§ 371 (c)(1),
(2) Date: Jan. 28, 2019

(87) PCT Pub. No.: WO2018/019099
PCT Pub. Date: Feb. 1, 2018

(65) Prior Publication Data
US 2020/0382906 A1    Dec. 3, 2020

(30) Foreign Application Priority Data

Jul. 29, 2016 (CN) .......................... 201610616050.1

(51) Int. Cl.
*H04W 4/029* (2018.01)
*H04W 76/27* (2018.01)
(Continued)

(52) U.S. Cl.
CPC .......... *H04W 4/029* (2018.02); *H04L 5/0051* (2013.01); *H04W 4/06* (2013.01); *H04W 8/14* (2013.01);
(Continued)

(58) Field of Classification Search
CPC ...... H04L 5/0051; H04W 4/029; H04W 4/06; H04W 8/14; H04W 56/001; H04W 68/005; H04W 76/27
See application file for complete search history.

(56) References Cited

U.S. PATENT DOCUMENTS

| 8,200,254 B2 * | 6/2012 | Wang .................... H04W 68/06 455/458 |
| 10,368,334 B2 * | 7/2019 | Park ....................... H04W 76/28 |

(Continued)

FOREIGN PATENT DOCUMENTS

| CN | 101448292 A | 6/2009 | |
| CN | 101803414 A * | 8/2010 | ............ H04W 68/06 |

(Continued)

OTHER PUBLICATIONS

European Patent Office, Jun. 19, 2019, PCT/CN2017091782, China Academy of Telecommunications Technology, Communication, European Search Report.

(Continued)

*Primary Examiner* — Eric Nowlin
(74) *Attorney, Agent, or Firm* — Flener IP & Business Law; Zareefa B. Flener (57) ABSTRACT

A method for managing a wireless system area, a terminal and a base station are provided. A new location management area for the terminal in an inactive connection state/RRC idle state is defined. The process of moving among different nodes in the area is simplified.

6 Claims, 6 Drawing Sheets

(51) Int. Cl.
*H04L 5/00* (2006.01)
*H04W 4/06* (2009.01)
*H04W 8/14* (2009.01)
*H04W 56/00* (2009.01)
*H04W 68/00* (2009.01)

(52) U.S. Cl.
CPC ....... *H04W 56/001* (2013.01); *H04W 68/005* (2013.01); *H04W 76/27* (2018.02)

(56) References Cited

U.S. PATENT DOCUMENTS

| | | | | |
|---|---|---|---|---|
| 10,397,860 | B2 * | 8/2019 | Stojanovski | H04W 48/20 |
| 10,582,560 | B2 * | 3/2020 | Park | H04W 76/27 |
| 10,764,861 | B2 * | 9/2020 | Ishii | H04W 60/04 |
| 10,856,259 | B2 * | 12/2020 | Park | H04W 68/025 |
| 2003/0061480 | A1 * | 3/2003 | Le | H04W 12/0609 |
| | | | | 713/153 |
| 2003/0145092 | A1 * | 7/2003 | Funato | H04W 48/20 |
| | | | | 709/229 |
| 2005/0232200 | A1 * | 10/2005 | Jeong | H04W 68/00 |
| | | | | 370/331 |
| 2009/0122727 | A1 * | 5/2009 | Gan | H04W 60/04 |
| | | | | 370/259 |
| 2010/0273512 | A1 * | 10/2010 | Wang | H04W 68/06 |
| | | | | 455/458 |
| 2013/0010619 | A1 | 1/2013 | Fong | |
| 2015/0223196 | A1 | 8/2015 | Kim et al. | |
| 2016/0127958 | A1 | 5/2016 | Viswanathan et al. | |
| 2016/0227396 | A1 * | 8/2016 | Lee | H04W 8/18 |
| 2017/0374612 | A1 * | 12/2017 | Stojanovski | H04W 60/04 |
| 2018/0092157 | A1 * | 3/2018 | Chen | H04W 76/27 |
| 2018/0199251 | A1 * | 7/2018 | Kim | H04W 72/042 |
| 2018/0227851 | A1 * | 8/2018 | Kubota | H04W 52/0229 |
| 2018/0234890 | A1 * | 8/2018 | Shih | H04W 60/00 |
| 2018/0270792 | A1 * | 9/2018 | Park | H04W 76/28 |
| 2018/0270895 | A1 * | 9/2018 | Park | H04W 76/38 |
| 2018/0359722 | A1 * | 12/2018 | Ishii | H04W 68/005 |
| 2019/0191483 | A1 * | 6/2019 | Ryoo | H04W 12/04033 |
| 2019/0335314 | A1 * | 10/2019 | He | H04W 8/08 |
| 2019/0357172 | A1 * | 11/2019 | Park | H04W 76/27 |
| 2020/0059851 | A1 * | 2/2020 | Kim | H04L 41/0806 |
| 2020/0084825 | A1 * | 3/2020 | Yang | H04W 76/27 |
| 2020/0120477 | A1 * | 4/2020 | Mildh | H04W 76/27 |
| 2020/0120741 | A1 * | 4/2020 | Lindheimer | H04W 74/002 |
| 2020/0178204 | A1 * | 6/2020 | Chen | H04W 68/005 |
| 2020/0187144 | A1 * | 6/2020 | Ying | H04W 76/30 |
| 2020/0196379 | A1 * | 6/2020 | Park | H04W 76/27 |
| 2020/0280954 | A1 * | 9/2020 | Fujishiro | H04W 68/00 |

FOREIGN PATENT DOCUMENTS

| | | | | |
|---|---|---|---|---|
| CN | 102170626 | A | | 8/2011 |
| CN | 101803414 | B | * | 6/2013 ........... H04W 68/06 |
| CN | 104737603 | A | | 6/2015 |
| CN | 105308198 | A | | 2/2016 |
| CN | 107635258 | A | | 1/2018 |
| CN | 107980238 | A | * | 5/2018 ........... H04W 60/04 |
| CN | 109548099 | A | * | 3/2019 ........ H04W 52/0212 |
| CN | 110546975 | A | * | 12/2019 ........... H04W 76/38 |
| CN | 110741696 | A | * | 1/2020 ......... H04W 68/005 |
| CN | 111052821 | A | * | 4/2020 ........... H04W 76/27 |
| DE | 112018004094 | T5 | * | 5/2020 ........... H04W 60/00 |
| EP | 1978759 | A1 | * | 10/2008 ........... H04W 60/04 |
| EP | 3281428 | A1 | * | 2/2018 ........... H04W 48/20 |
| EP | 3281428 | A4 | * | 2/2019 ........... H04W 60/04 |
| EP | 3516890 | A2 | * | 7/2019 ........... H04W 68/00 |
| EP | 3636017 | A1 | * | 4/2020 ........... H04W 60/04 |
| GB | 201712862 | | * | 9/2017 ........... H04W 4/029 |
| GB | 2565536 | A | * | 2/2019 ........... H40W 68/02 |
| JP | 6602888 | B2 | * | 11/2019 ........... H04W 48/16 |
| KR | 20190127852 | A | * | 11/2019 ........... H04W 8/005 |
| WO | WO-2009079852 | A1 | * | 7/2009 ........... H04W 68/06 |
| WO | 2016010523 | A1 | | 1/2016 |
| WO | WO-2018170516 | A2 | * | 9/2018 ........... H04W 60/00 |
| WO | WO-2018226645 | A1 | * | 12/2018 ........... H04W 76/27 |
| WO | WO-2018170516 | A3 | * | 2/2019 ........... H04W 68/00 |
| WO | WO-2019033817 | A1 | * | 2/2019 ........... H04W 48/04 |

OTHER PUBLICATIONS

Nanjing, China, May 23-27, 2016, R2-163582, Agenda Item: 9.4.3.2.2, Source: Intel Corporation, Title: Standalone NR: Discussion on Mobility Framework, Document for: Discussion.
SA WG2 Meeting #113, S2-161057, Feb. 23-26, 2016, Sophia Antipolis, FR, Source: Intel, Title: Solution to Key Issue on Mobility Framework, Document for: Approval, Agenda Item: 6.10, Work Item/Release: Nexgen / Rel-14.
European Union Office Action, Application No. 17 833 402.5-1212, Jun. 4, 2020, China Academy of Telecommunications Technology.
3GPP TSG RAN WG3 Meeting #92, R3-161083, May 23-27, 2016, Nanjing, China, Agenda Item 10.3.1, Source: Intel Corporation, Title: Next Generation NR Mobility Management Framework, Document for: Discussion.
SA WG2 Meeting #113, S2-161057, Feb. 23-26, 2016, Sophia Antipolis, France, Agenda Item 6.10, Source: Intel, Title: Solution to Key Issue on Mobility Framework, Document for: Approval.
3GPP TSG RAN WG2 Meeting #94, R2-163582, May 23-27, 2016, Nanjing, China, Agenda Item: 9.4.32.2, Source: Intel Corporation, Title: Standalone NR: Discussion on Mobility Framework, Document for: Discussion.
First Office Action—PRC Application No. 201610616050.1.
Written Opinion and ISR for PCT/CN2017/091782.
Japanese Office Action, Notice of Reasons for Refusal, Application No. 2019-504972, Date of Drafting: REIWA 1 (2019) Nov. 8, 2019, Nobuyuki 9469 5J00.
3GPP TSG-RAN WG2 Meeting #94, Nanjing, China, May 23-27, 2016, R2-163830, Title: Discussion on New State in 5G NR, Agenda: 9.4.3.2.2, Document for: Discussion, Source: Samsung Electronics Co., Ltd.
3GPP SA WG2 TD S2-161057, SA WG2 Meeting #113, Sophia Antipolis, France, Feb. 23-26, 2016, Title: Solution to Key Issue on Mobility Framework, Source: Intel, Document for: Approval.

* cited by examiner

METHOD FOR MANAGING WIRELESS SYSTEM AREA, TERMINAL AND BASE STATION

CROSS REFERENCE OF RELATED APPLICATION

The present application is the U.S. national phase of PCT Application PCT/CN2017/091782 filed on Jul. 5, 2017, which claims a priority of Chinese patent application No. 201610616050.1 filed on Jul. 29, 2016, which is incorporated herein by reference in its entirety.

TECHNICAL FIELD

The present disclosure relates to the field of wireless communication technologies, and in particular to a method for managing a wireless system area, a terminal and a base station.

BACKGROUND

A plurality of terminal states, such as a radio resource control idle state (RRC_IDLE), a radio resource control connection state (RRC_CONNECTED), a light connection, and the like, are defined in a Long Term Evolution (LTE) system. With the development of wireless communication systems, terminal types and service types are diversified. The terminal is required to save power, save network resources and meet the needs of various service types. In order to achieve the power saving and the fast data transmission of the terminal at the same time, a terminal state, Inactive state is introduced, which is also called an inactive connection state. In this state, the terminal (UE) maintains the core network connection, but does not perform the normal operation of the radio interface connection state (such as handover, uplink timing update, radio link monitoring, etc.), and does not allocate directly the terminal identifier used for the radio interface transmission (such as C-RNTI), therefore it is not able to directly perform radio interface scheduling transmission. The inactive connection state has the following characteristics:
the terminal is in a connected state from the perspective of the core network;
the mobility is performed by the terminal, and is performed by cell reselection in the radio access network (RAN) tracking area preconfigured on the network side, instead of the handover process;
the terminal is allocated with a unique user identity within the RAN tracking area preconfigured by the network side;
In the inactive connection state, the network side allocates a RAN identifier valid in a certain area for the terminal. The identifier is used to identify the terminal in the inactive connection state. The identifier can be used as identification for the terminal to turn to the connection state when network side seeks the terminal or the terminal initiates the uplink access. The identifier may be referred to as an Inactive UE ID, and may also be referred to as a resume UE ID. The identifier is different from the globally unique IMSI or the connected terminal identifier C-RNTI, and the length of identifier is between the two (for example, the length of the Inactive UE ID is 40 bits, and the length of the C-RNTI is 16 bits), and the identifier is only valid in a certain area including the multiple cells or base stations (eNBs). If the area is exceeded, the terminal needs to update the Inactive UE ID.

In the related art, a single node or a small number of nodes of an ideal backhaul connection constitutes one cell (Cell). For a terminal in the connected state, the terminal handovers among cells needs to perform a handover process and update security parameters. In the case of a large number of network nodes in the future and each node having a small coverage, if the Inactive UE still operates according to the conventional cell settings and cell operations, the mobility process will occur very frequently, the user experience may be bad, and the network efficiency may be relatively low. Similarly, the above problem also exists for terminals in the RRC idle state.

SUMMARY

The technical issue to be solved by the embodiments of the present disclosure is to provide a method for managing a wireless system area, a terminal and a base station, so as to reduce the frequency of occurrence of a mobility process of a terminal in an RRC idle state or an inactive connection state, improve network efficiency, and improve user experience.

To solve the above technical issue, a method for managing a wireless system area is provide in some embodiments of the present disclosure, including:
receiving, by a resident base station where a first terminal resides, a radio access network tracking area RTA update request sent by the first terminal and carrying information of an anchor base station of the first terminal;
determining, by the resident base station, whether the resident base station is the anchor base station of the first terminal, based on the information of the anchor base station of the first terminal carried in the RTA update request; and
updating, by the resident base station, RTA information to which the first terminal belongs, and sending, by the resident base station, a RTA update acknowledgement message to the first terminal, in the case that the resident base station determines that the resident base station is the anchor base station of the first terminal.

Another method for managing a wireless system area is further provide in some embodiments of the present disclosure, including:
sending, by a terminal in a radio resource control RRC idle state or an inactive connection state, to a resident base station where the terminal resides, a radio access network tracking area RTA update request carrying information of an anchor base station of the terminal; and
receiving, by the terminal, a RTA update acknowledgement message returned by the resident base station, and updating RTA information to which the terminal belongs.

A resident base station is further provided in some embodiments of the present disclosure, including:
a request receiving unit, configured to receive a radio access network tracking area RTA update request sent by a first terminal and carrying information of an anchor base station of the first terminal;
a determination unit, configured to determine whether the resident base station is the anchor base station of the first terminal based on the information of the anchor base station of the first terminal carried in the RTA update request, and perform a trigger of an update unit in the case that the resident base station is the anchor base station of the first terminal; and
the update unit, configured to update RTA information to which the first terminal belongs in response to the trigger performed by the determination unit and send a RTA update acknowledgement message to the first terminal.

A terminal is further provided in some embodiments of the present disclosure, including:

a request unit, configured to, in the case that the terminal is in a radio resource control RRC idle state or an inactive connection state, send to a resident base station where the terminal resides, a radio access network tracking area RTA update request carrying information of an anchor base station of the terminal; and a maintenance update unit, configured to receive a RTA update acknowledgement message returned by the resident base station and update RTA information to which the terminal belongs.

A resident base station is further provided in some embodiments of the present disclosure, including: a transceiver, a processor, and a storage for storing instructions used by the processor when performing an operation, where the transceiver is configured to receive a radio access network tracking area RTA update request sent by a first terminal and carrying information of an anchor base station of the first terminal;

the processor is configured to determine whether the resident base station is the anchor base station of the first terminal based on the information of the anchor base station of the first terminal carried in the RTA update request received by the transceiver, and update RTA information to which the first terminal belongs and send a RTA update acknowledgement message to the first terminal in the case that the resident base station is the anchor base station of the first terminal.

A terminal is further provided in some embodiments of the present disclosure, including: a transceiver, a processor, and a storage for storing instructions used by the processor when performing an operation, where the transceiver is configured to, in the case that the terminal is in a radio resource control RRC idle state or an inactive connection state, send to a resident base station where the terminal resides a radio access network tracking area RTA update request carrying information of an anchor base station of the terminal, and receive a RTA update acknowledgement message returned by the resident base station;

the processor is configured to update RTA information to which the terminal belongs.

According to a method for managing a wireless system area, a terminal and a base station are provided in the present disclosure, a new location management area for the terminal in an inactive connection state/RRC idle state is defined. The process of moving among different nodes in the area is simplified, the signaling load for the core network is reduced, the paging area at the RAN side is reduced, the system efficiency is improved, and the user experience is improved.

DETAILED DESCRIPTION

The technical problems, the technical solutions, and the advantages of the present disclosure will be more clearly described in conjunction with the accompanying drawings and specific embodiments. In the following description, specific details such as specific configurations and components are provided only to assist in a comprehensive understanding of the embodiments of the present disclosure. It will be apparent to those skilled in the art that various changes and modifications may be made to the embodiments described herein without departing from the scope and spirit of the disclosure. In addition, descriptions of well-known functions and constructions are omitted for clarity and conciseness.

It is to be understood that the phrase "one embodiment" or "an embodiment" refers to that the specific characteristics, structure or characters related to the embodiment is included in at least one embodiment of the present disclosure. Thus, "in one embodiment" or "in an embodiment" does not necessarily refer to the same embodiment. In addition, these particular features, structures, or characteristics may be combined in any suitable manner in one or more embodiments.

In various embodiments of the present disclosure, it should be understood that the serial numbers of the following processes does not mean the order of implementation, and the order of implementation of each process should be determined by its function and internal logic, and should not limit the implementation process of the embodiments of the present disclosure.

In addition, the terms "system" and "network" may be used interchangeably herein.

It should be understood that the term "and/or" herein is merely an association relationship describing an associated object, indicating that there may be three relationships, for example, A and/or B, which may indicate three cases, i.e., A exists separately, A and B exist simultaneously, and B exists separately. In addition, the character "/" in the present disclosure generally indicates that the contextual objects are alternatively.

In the embodiments provided herein, it should be understood that "B corresponding to A" means that B is associated with A, and B can be determined based on A. However, it should also be understood that determining B based on A does not mean that B is determined based on A only, and that B may also be determined based on A and/or other information.

In the embodiment of the present disclosure, the resident base station is a base station where the terminal resides, for example, a base station where the terminal resides after the terminal is powered on, or a based station where the terminal resides by reselecting a cell. An anchor base station of a certain terminal is a base station that establishes a dedicated connection with the terminal and the core network node. The resident base station of a certain terminal may be the anchor base station of the terminal, or may not be the anchor base station of the terminal.

In the embodiment of the present disclosure, the terminal may be a mobile phone (or a mobile phone), or other device capable of transmitting or receiving a wireless signal, including a user equipment (UE), a personal digital assistant (PDA), a wireless modem, a wireless communication device, handheld devices, laptop computers, cordless phones, wireless local loop (WLL) stations, CPE (Customer Premise Equipment) or mobile smart hotspots, smart home appliances, or other non-passengers capable of converting mobile signals into WiFi signals, or a device capable of spontaneously communicating with a mobile communication network with any manual operation.

In the embodiment of the present disclosure, the form of the base station is not limited, the base station may be a Macro Base Station, a Pico Base Station, a Node B (a name of a 3G mobile base station), an enhanced base station (eNB), a home enhanced base station (Femto eNB or Home eNode B or Home eNB or HeNB), a relay station, an access point, an RRU (Remote Radio Unit), an RRH (Remote Radio Head), and the like. In addition, with the development of 5G technology, the base station may be replaced with other functional nodes, such as a central unit (CU) and a distributed unit (DU). The embodiments of the present disclosure may be applied to the foregoing scenario. The RAN side architecture in a possible networking scenario of the LTE networking and the 5G will be briefly described below.

LTE networking scenario: base station+terminal

Figure 1:
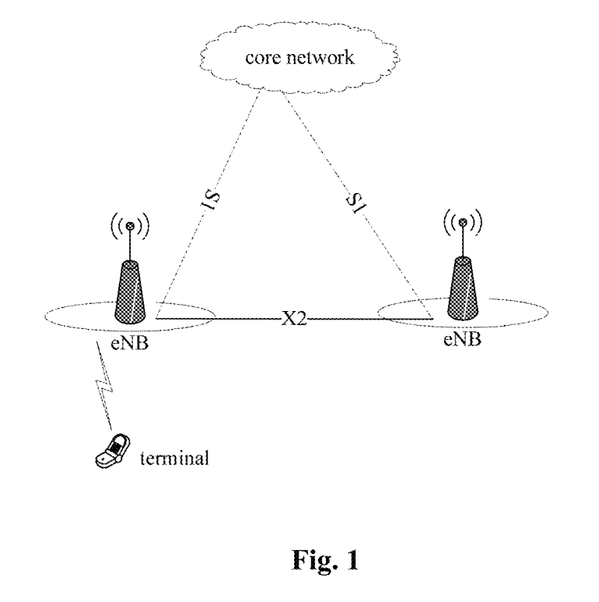
FIG. 1 is a schematic view of an application scenario of a method for managing a wireless system area in some embodiments of the present disclosure.

FIG. 1 is a typical LTE architecture. There is a plurality of cells under the base station (eNB), and the connected terminal (UE) and the cell perform the radio interface data transmission and reception, and the connected UE is allocated a unique UE identity (C-RNTI) in the cell. The base stations may communicate with each other through the X2 interface, and the base station and the core network may communicate with each other through the S1 interface.

In the 5G network scenario, the network side node includes a central unit (CU) and a distributed unit (DU), and the user side node is a terminal (UE).

Figure 2:
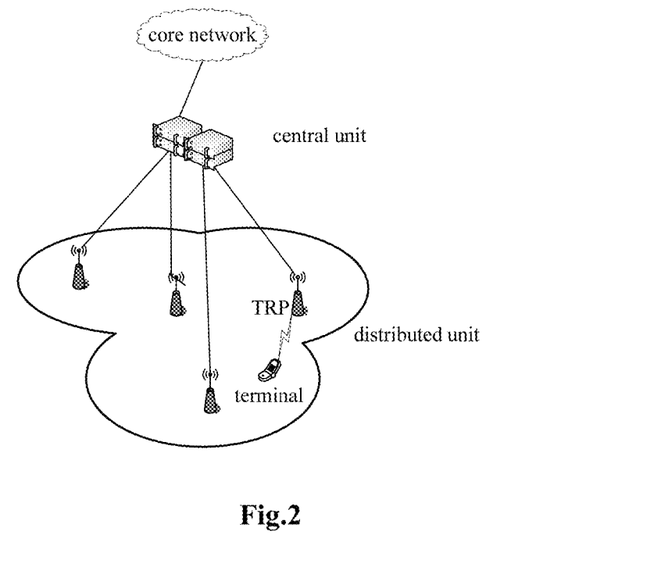
FIG. 2 is a schematic view of another application scenario of a method for managing a wireless system area in some embodiments of the present disclosure.

FIG. 2 is a possible 5G architecture of the future mobile communication. The network side node includes a central unit and a distributed unit, and one central unit controls a plurality of distributed units deployed in a certain area, and these distributed units may also be referred to as Transmission Reception Point (TRP). The TRP and the terminal perform the radio interface transmission. One or more transmission points may simultaneously serve the terminal for data transmission. Here, the terminal radio interface unique identifier assigned to the terminal by the network side is used for data scheduling and transmission. The identifier may be C-RNTI or TRP-RNTI.

The embodiments of the present disclosure may be applied to the foregoing two RAN architectures, and may also be applied to other scenarios than the foregoing scenarios. For the unified description, the network side wireless signaling and data transceiving nodes are collectively referred to as a base station, including the eNB in FIG. 1 and the CU/DU in FIG. 2 (the specific transceiving point is the TRP).

In the case of a large number of network nodes in the future and each node having a small coverage, if the UE in the RRC idle state or the inactive connection state still operates according to the conventional cell settings and cell operations, the mobility process will occur very frequently, the user experience and the network efficiency may be adversely affected.

In the embodiments of the present disclosure, a concept of a radio access network tracking area (RTA) at the radio access network (RAN) side is proposed, and the RTA defines an area where the network side initiates a paging to the terminal. The RTA may be a System Information Area (SIA), a Cell or an RTA ID. It may also be a set of a plurality of SIAs of one base station or a plurality of cells of one base station or a plurality of RTA IDs of one base station. The RTA may also be a set of SIAs of a plurality of base stations, cells of a plurality of base stations or RTA IDs a plurality of base stations. Here, the RTA ID represents an identification of RTA, and the RTA ID can be configured to be mapped to one or more SIA/Cells so that one or more SIAs/Cells can be indicated by the RTA ID.

That is, the RTA may include one or more SIAs, one or more cells, or SIA/cells corresponding to one or more RTA IDs. The SIA/Cell/RTA ID included in one RTA may belong to the same base station or may belong to different base stations. In some embodiments of the present disclosure, the RTA information is configured to indicate a set of SIAs/Cells/RTA IDs included in the RTA or a subset of the set.

In the embodiment of the present disclosure, when the moves within the RTA, the terminal may select the base station to be resided by the cell reselection process. The terminal updates the RTA information by performing an RTA update (RTAU) process while moving between RTAs. For the intra-eNB and inter-RTA mobile scenario within the coverage of the base station, the RTAU process can be ended at the RAN side. The base station needs to update and save the latest RTA information of the UE, and does not need to send a signaling to the core network. For the RTAU in the inter-eNB and inter-RTA mobile scenario across the base station, the base station may send a signaling to the core network, update the anchor base station of the terminal, or update the RTA information to which the terminal belongs to the previous anchor base station. When receiving the data or signaling or paging message of the core network, the anchor base station may initiate a paging in the corresponding RTA based on the saved latest RTA information to which the terminal belongs.

In addition, in some embodiments of the present disclosure, the base station may also configure for the terminal an RTAU timer for periodically initiating an RTAU process, and the terminal periodically initiates the RTAU process through the RTAU timer to update its own RTA information to the base station.

In the embodiment of the present disclosure, there are two ways to configure the RTA:

RTA configuration mode 1: the RTA of each base station may be statically configured according to the network deployment. For example, the base station may notify the terminal which SIAs/Cells/RTA IDs belongs to a certain RTA through the RTA information of the base station carried by a synchronization signal, a reference signal, or a broadcast signal. In this manner, the synchronization signal, the reference signal, or the broadcast signal can transmit less information, so the RTA information carried therein is usually an RTA ID or a subset of SIA/cells included in the RTA. The terminal may perform an RTAU process based on the RTA information.

In some embodiments of the present disclosure, the terminal may determine whether the RTAU process needs to be performed based on a determination of whether the RTA information of the base station carried in the synchronization signal, the reference signal, or the broadcast message does not match the RTA information to which the terminal belongs currently maintained by the terminal.

RTA configuration mode 2: the base station may dynamically configure the RTA for the terminal according to the terminal attributes (such as the terminal speed and the traffic patterns). Specifically, the base station may notify the terminal, through a dedicated signaling, of the RTA information configured for the terminal. The base station may allocate a corresponding SIA/Cell/RTA ID list to the terminal according to the preset attribute of the terminal when configuring the RTA for the terminal, and the SIA/Cell/RTA ID included in the list constitutes the RTA of the terminal. In this manner, the RTA information that can be configured for the terminal may be a set of all SIA/Cell/RTA IDs allocated to the terminal, that is, all SIA lists, cell lists, or RTA ID lists of the RTA.

In some embodiments of the present disclosure, the terminal may determine whether the RTAU process needs to be performed based on a determination of whether the RTA information of the base station configured for itself does not match the RTA information to which the terminal belongs currently maintained by the terminal.

Figure 3:
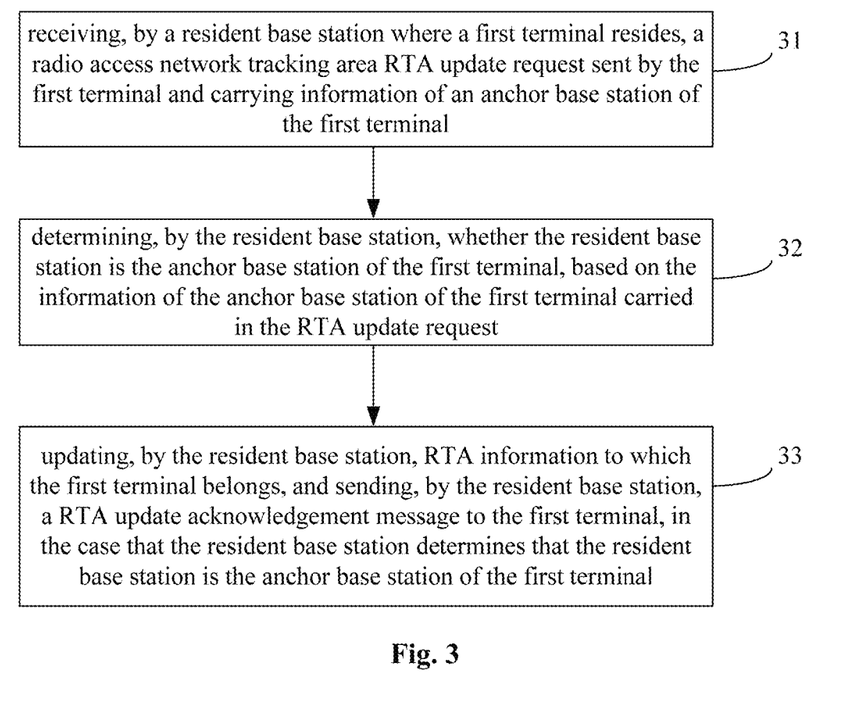
FIG. 3 is a flowchart of a method for managing a wireless system area in some embodiments of the present disclosure.

Referring to FIG. 3, a method for managing a wireless system area is provided in some embodiments of the present disclosure. When applied to a base station, the method includes:

Step 31: receiving, by a resident base station where a first terminal resides, a radio access network tracking area RTA update request sent by the first terminal and carrying information of an anchor base station of the first terminal;

Here, when the first terminal is in the RRC idle state or the inactive connection state, if the preset RTA update period is reached, or when it is determined that the RTA may be updated, an RTA update request is sent to the resident base station to request an update of the RTA of the terminal, where RTA update request carries the information of the anchor base station of the first terminal.

Step 32: determining, by the resident base station, whether the resident base station is the anchor base station of the first terminal, based on the information of the anchor base station of the first terminal carried in the RTA update request.

Here, when the first terminal in the RRC idle state or the inactive connection state moves between the base stations, the resident base station of the first terminal may not be the anchor base station of the first terminal. When the first terminal moves within the base station, the resident base station of the first terminal may be the anchor base station of the first terminal. Therefore, in Step 32, the resident base station determines whether it is the anchor base station of the first terminal based on the information of the anchor base station sent by the first terminal.

Step 33: updating, by the resident base station, RTA information to which the first terminal belongs, and sending, by the resident base station, a RTA update acknowledgement message to the first terminal, in the case that the resident base station determines that the resident base station is the anchor base station of the first terminal.

Here, in Step 33, when the resident base station is the anchor base station of the first terminal, the RTAU process is ended at the RAN side, and the resident base station does not need to send a signaling to the core network, and the resident base station will update the RTA information to which the first terminal belongs. Based on the configuration method of RTA, the update method includes:

when the static configuration mode of the RTA configuration mode 1 is adopted, the resident base station may determine, based on the physical layer signal, the access cell that the first terminal accesses, and then update the RTA information to which the first terminal belongs based on the RTA corresponding to the access cell;

when the dynamic configuration mode of the RTA configuration mode 2 is adopted, the resident base station configures for the first terminal corresponding RTA information based on the preset attribute information of the first terminal, such as the moving speed of the terminal, the traffic patterns, and the like. The RTA information to which the first terminal belongs is updated based on the RTA information configured for the first terminal.

Through the above steps, when the resident base station serves as the anchor base station of the first base terminal, the RTAU process may be ended at the RAN side, thereby reducing the occupation of the core network resources. In addition, since the RTAU is initiated based on the RTA, it is able to reduce the frequency of the mobility process of the terminal in the RRC idle state or the inactive connection state, enhance the network efficiency and improve the user experience.

In some embodiments of the present disclosure, if it is determined in the foregoing Step 32 that the resident base station is not the anchor base station of the first terminal, the RTAU processing may be performed through the following two manners.

Embodiment 1: in the case that the resident base station determines that the resident base station is not the anchor base station of the first terminal, acquiring context information of the first terminal from the anchor base station, initiating a RAN anchor base station update to a core network node, and updating the anchor base station of the first terminal to the resident base station, updating the RTA information to which the first terminal belongs, and sending the RTA update acknowledgement message to the first terminal.

In the Embodiment 1, the resident base station needs to initiate an update process of the anchor base station to the core network, so that the core network may update the anchor base station of the first terminal to the resident base station. In addition, the resident base station may carry the indication information of the new anchor base station of the terminal in the RTA update acknowledgement message, where the indication information is used to indicate that the new anchor base station base station of the terminal is the resident base station, and then the terminal may update its own information of the anchor base station accordingly.

Embodiment 2: in the case that the resident base station determines that the resident base station is not the anchor base station of the first terminal, updating the RTA information to which the first terminal belongs in the case that the resident base station determines that the resident base station is not the anchor base station of the first terminal; sending, by the resident base station, the RTA information to which the first terminal belongs to the anchor base station, to update context information of the first terminal maintained by the anchor base station; and sending, by the resident base station, the RTA update acknowledgement message to the first terminal.

In the Embodiment 2, the resident base station may end the RTAU process at the RAN side to reduce the occupation of the core network resources. At this time, the resident base station initiates the update of the RTA information to which the first terminal belongs to the anchor base station, so that the anchor base station may update the context information of the first terminal accordingly. In the case of receiving the downlink data, a signaling or a paging message sent by the core network to the first terminal, the anchor base station may initiate a paging in the corresponding RTA via the resident base station based on the saved RTA information of the UE.

In some embodiments of the present disclosure, the resident base station may send the RTA information of the resident base station through the synchronization signal, the reference signal, or the broadcast message, so that the terminal may obtain the RTA information of the base station through the RTA information, and then match the RTA information of the base station with the RTA information to which the terminal belongs, or the RTA information of the base station is taken as the RTA information to which the terminal belongs, and saved and maintained locally.

Through the above steps, the resident base station may locally maintain and update the RTA information to which the first terminal belongs, so that if the paging for the first terminal needs to be initiated subsequently, the resident base station may initiate the paging within the RTA corresponding to the RTA information based on the RTA information to which the first terminal belongs.

In some embodiments of the present disclosure, when the RTA configuration mode 2 is adopted, if a terminal (herein referred to as a second terminal) resides at the resident base station, assuming that the network side controls the terminal to be in an RRC idle state or an inactive connection state, if the resident base station detects that the second terminal is in the RRC idle state or the inactive connection state, the resident base station may configure the corresponding RTA information for the second terminal based on the preset attribute information of the second terminal, and send the RTA information to the second terminal, then the RTA information to which the second terminal belongs may be updated based on the RTA information configured for the second terminal. The second terminal herein may be the first terminal hereinabove, or may be a different terminal.

In addition, in order to achieve the periodic RTAU process, when the resident base station detects that the second terminal is in the RRC idle state or the inactive connection state, the resident base station may determines, for the second terminal, an RTA update period for periodically initiating the RTA update process, and configure the RTA update period for the second terminal, so as to enable the second terminal to periodically initiate an RTAU process according to the RTA update period.

Figure 4:
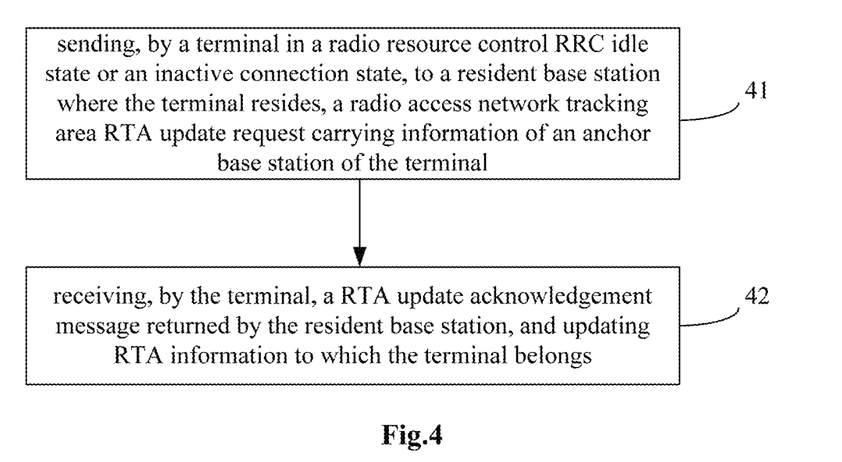
FIG. 4 is another flowchart of a method for managing a wireless system area in some embodiments of the present disclosure.

Referring to FIG. 4, a method for managing a wireless system area is further provided in some embodiments of the present disclosure. When applied to a terminal, the method includes:

Step 41: sending, by a terminal in a radio resource control RRC idle state or an inactive connection state, to a resident base station where the terminal resides, a radio access network tracking area RTA update request carrying information of an anchor base station of the terminal;

Here, in the above Step 41, the terminal may send an RTA update request carrying the information of the anchor base station of the terminal to the resident base station when the preset RTA update period is reached, or when it is determined that the RTA may be updated.

To be specific, the determining that the RTA may be updated further includes:

parsing, by the terminal, a synchronization signal, a reference signal or a broadcast message sent by the resident base station and received by the terminal, to acquire RTA information of the resident base station carried by the synchronization signal, the reference signal or the broadcast message; determining whether the RTA information of the resident base station matches RTA information to which the terminal currently belongs, and determining that the RTA may be updated in the case that the RTA information of the resident base station does not match the RTA information to which the terminal currently belongs; in the case that the RTA information of the resident base station matches the RTA information to which the terminal currently belongs, no action is performed, and the process is directly ended;

Or, receiving RTA information configured by the resident base station for the terminal, determining whether the RTA information configured for the terminal matches RTA information to which the terminal currently belongs, and determining that the RTA may be updated in the case that the RTA information configured for the terminal does not match the RTA information to which the terminal currently belongs; in the case that the RTA information configured for the terminal matches the RTA information to which the terminal currently belongs, no action is performed, and the process is directly ended.

Step 42: receiving, by the terminal, a RTA update acknowledgement message returned by the resident base station, and updating RTA information to which the terminal belongs.

Here, the updating the RTA information to which the terminal belongs in Step 42 may further include:

when the static configuration mode of the above RTA configuration mode 1 is adopted, parsing, by the terminal, a synchronization signal, a reference signal or a broadcast message sent by the resident base station and received by the terminal, to acquire RTA information of the resident base station carried by the synchronization signal, the reference signal or the broadcast message, and updating the RTA information to which the terminal belongs based on the RTA information of the resident base station;

when the dynamic configuration mode of the above RTA configuration mode 2 is adopted, parsing, by the terminal, the RTA update acknowledgement message, and acquiring RTA information carried by the RTA update acknowledgement message and configured by the resident base station for the terminal, and updating, by the terminal, the RTA information to which the terminal belongs based on the RTA information configured by the resident base station.

In addition, when the dynamic configuration mode of the above RTA configuration mode 2 is adopted, the base station may initiate an anchor base station update process of the terminal, and update the base station to the anchor base station of the terminal, and may carry the indication information of the new anchor base station of the terminal in the RTA update acknowledgement message, and the indication information is used to indicate that the new anchor base station base station of the terminal is the base station. In this way, the terminal in some embodiments may further parse the RTA update acknowledgement message, acquire the indication information of the new anchor base station of the terminal carried therein, and update, according to the indication information of the new anchor base station, the information of the anchor base station maintained by the terminal.

Through the above steps, the terminal in the embodiment of the present disclosure may initiate an RTAU process according to different trigger conditions. The RTAU process is performed based on the RTA, so it is able to reduce the frequency of the mobility process of the terminal in the RRC idle state or the inactive connection state, enhance the network efficiency and improve the user experience.

The above steps describe the processing flow of the terminal in the RRC idle state or the inactive connection state. The embodiment of the present disclosure further provides how to obtain RTA information when the terminal is in the RRC idle state or the inactive connection state.

For example, when the static configuration mode of the RTA configuration mode 1 is adopted, when the terminal is in the RRC idle state or the inactive connection state, the terminal may receive the synchronization signal, the reference signal, or the broadcast message sent by the resident base station of the terminal, and parse the synchronization signal, the reference signal, or the broadcast message to acquire the RTA information of the base station carried therein, and then save the RTA information as the RTA information to which the terminal belongs.

For another example, when the dynamic configuration mode of the above RTA configuration mode 2 is adopted, when the terminal is in the RRC idle state or the inactive connection state, the terminal may receive the RTA information configured by the resident base station for the terminal, and acquire the RTA information to which the terminal belongs based on the RTA information configured by the resident base station and save the RTA information to which the terminal belongs.

A base station and a terminal implementing the above method will be further provided below.

Figure 5:
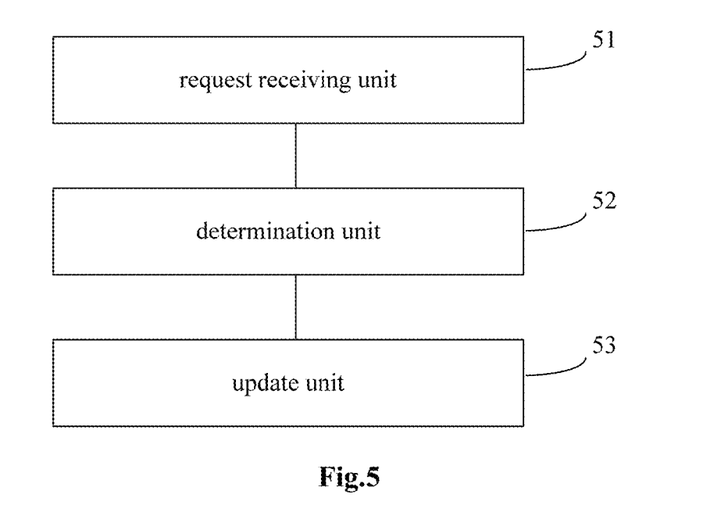
FIG. 5 is a schematic view of a resident base station in some embodiments of the present disclosure.

Referring to FIG. 5, a resident base station is provided in some embodiments of the present disclosure, including:

a request receiving unit 51, configured to receive a radio access network tracking area RTA update request sent by a first terminal and carrying information of an anchor base station of the first terminal;

a determination unit 52, configured to determine whether the resident base station is the anchor base station of the first terminal based on the information of the anchor base station of the first terminal carried in the RTA update request, and perform a trigger of an update unit in the case that the resident base station is the anchor base station of the first terminal; and the update unit 53, configured to update RTA information to which the first terminal belongs in response to the trigger performed by the determination unit and send a RTA update acknowledgement message to the first terminal.

In some embodiments of the present disclosure, the resident base station may initiate an update process of the anchor base station to the core network when the base station is not the anchor base station of the terminal, and the determination unit is further configured to, in the case that the resident base station is not the anchor base station of the first terminal, trigger a first processing unit and the update unit. The above resident base station further includes:

the first processing unit configured to acquire, in response to the trigger performed by the determination unit, context information of the first terminal from the anchor base station, initiate a RAN anchor base station update to a core network node, and update the anchor base station of the first terminal to the resident base station.

In some embodiments of the present disclosure, the resident base station may initiate an RTA update process of the terminal to the anchor base station base station when the base station is not the anchor base station of the terminal, and the determination unit is further configured to, in the case that the resident base station is not the anchor base station of the first terminal, trigger a second processing unit and the update unit. The resident base station further includes:

the second processing unit configured to, in response to the trigger performed by the determination unit and in the case that the resident base station is not the anchor base station of the first terminal, send the RTA information to which the first terminal belongs to the anchor base station, to update context information of the first terminal maintained by the anchor base station.

In some embodiments of the present disclosure, when the RTA information of the resident base station is statically configured in advance, the update unit includes: a first maintenance unit configured to determine an access cell of the first terminal and update the RTA information to which the first terminal belongs based on a RTA corresponding to the access cell.

In some embodiments of the present disclosure, when the RTA information of the resident base station is dynamically configured for the terminal, the update unit includes: a second maintenance unit, configured to configure corresponding RTA information for the first terminal based on preset attribute information of the first terminal, update the RTA information to which the first terminal belongs based on the corresponding RTA information configured for the first terminal, and send to the first terminal the RTA update acknowledgement message carrying the corresponding RTA information configured for the first terminal.

When the foregoing RTA configuration mode 1 is adopted, the resident base station may further include:

a sending unit, configured to send a synchronization signal, a reference signal or a broadcast message carrying the RTA information of the resident base station.

The resident base station in some embodiments of the present disclosure further includes the following units to initiate a paging or implement related configuration functions:

a paging unit, configured to, in the case that a paging for the first terminal needs to be initiated, initiate the paging within a RTA corresponding to the RTA information to which the first terminal belongs;

a first configuration unit, configured to, in the case that the resident base station serves as an anchor base station of a second terminal and detects that the second terminal is in a radio resource control RRC idle state or an inactive connection state, configure corresponding RTA information for the second terminal based on preset attribute information of the second terminal and send the corresponding RTA information to the second terminal, and update the RTA information to which the second terminal belongs based on the corresponding RTA information configured for the second terminal;

a second configuration unit, configured to, in the case that the resident base station detects that the second terminal is in the radio resource control RRC idle state or the inactive connection state, determine a RTA update period for initiating the RAT update periodically for the second terminal and configure the RTA update period for the second terminal.

Figure 6:
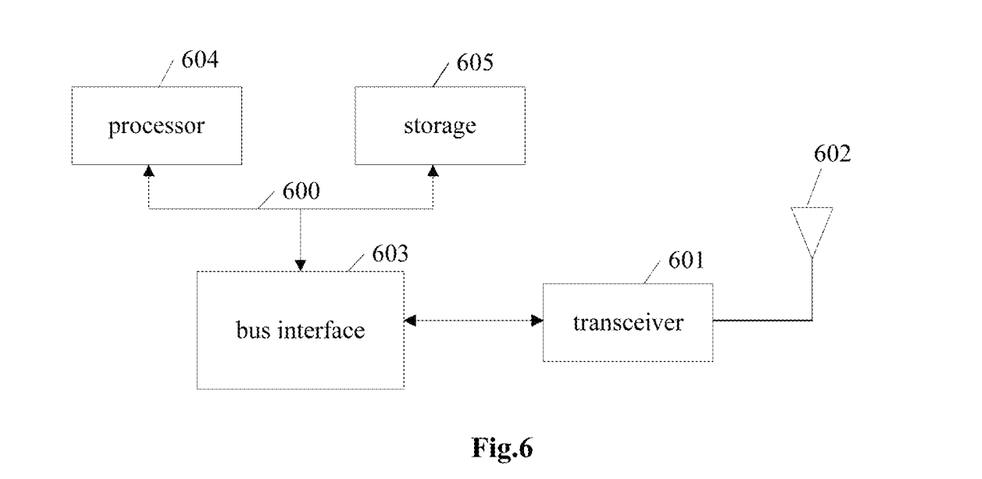
FIG. 6 is another schematic view of a resident base station in some embodiments of the present disclosure.

Referring to FIG. 6, a resident base station is further provided in some embodiments of the present disclosure, including:

a transceiver 601, configured to receive and transmit data under the control of a processor 604. Specifically, the transceiver 601 may receive a radio access network tracking area RTA update request sent by a first terminal and carrying information of an anchor base station of the first terminal and send a RTA update acknowledgement message to the first terminal;

the processor 604 is configured to read a program in a storage 605 to perform the following process:

determine whether the resident base station is the anchor base station of the first terminal based on the information of the anchor base station of the first terminal carried in the RTA update request received by the transceiver 601, and update RTA information to which the first terminal belongs and control the transceiver 601 to send a RTA update acknowledgement message to the first terminal in the case that the resident base station is the anchor base station of the first terminal.

In FIG. 6, the bus architecture (represented by bus 600) may include any number of interconnected buses and bridges, which may connect various circuits of one or more processors represented by processor 604 and the storage represented by first storage 605. The bus 600 can also connect various other circuits, such as peripherals, voltage regulators, and power management circuits, as is known in the art, and therefore will not be further described herein. The bus interface 603 provides an interface between bus 600 and transceiver 601. The transceiver 601 may be an element or a plurality of elements, such as multiple receivers and transmitters, providing units for communicating with various other devices on a transmission medium. Data processed by the first processor 604 is transmitted over the wireless medium by the transceiver 601 and the antenna 602. Further, the antenna 602 also receives the data and transmits the data to the processor 604 via the transceiver 601.

The processor 604 is configured to manage the bus 600 and the usual processing, and may also provide various functions including timing, peripheral interfaces, voltage regulation, power management, and other control functions. The storage 605 is configured to store data used by the processor 604 when performing operations. Specifically, the processor 604 may be a CPU, an ASIC, an FPGA, or a CPLD.

In some embodiments of the present disclosure, the processor 604 may be further configured to, when determining that the base station is not the anchor base station of the first terminal, acquire context information of the first terminal from the anchor base station through the antenna 602 and the transceiver 601, and initiate by the transceiver 601 and the antenna 602 a RAN anchor base station update process to the core network node, update the anchor base station of the first terminal to the base station; and update the RTA information to which the first terminal belongs, and send the RTA update acknowledgement message to the first terminal through the transceiver 601 and the antenna 602.

In some embodiments of the present disclosure, the processor 604 may be further configured to: when determining that the base station is not the anchor base station of the first terminal, update the RTA information to which the first terminal belongs, send the RTA information to which the first terminal belongs to the anchor base station through a transceiver 601 and antenna 602, to update context information of the first terminal maintained by the anchor base station, and send an RTA update confirmation message to the first terminal.

Specifically, when the resident base station adopts the static configuration RTA mode, the processor 604 may update the RTA information to which the first terminal belongs in the following manner: determining an access cell of the first terminal, and update the RTA information to which the first terminal belongs based on the RTA of the access cell.

Specifically, when the resident base station adopts the dynamic configuration RTA mode, the processor 604 may configure corresponding RTA information for the first terminal based on preset attribute information of the first terminal, update the RTA information to which the first terminal belongs based on the corresponding RTA information configured for the first terminal, and send to the first terminal the RTA update acknowledgement message carrying the corresponding RTA information configured for the first terminal.

In some embodiments of the present disclosure, the processor 604 may further send, through the transceiver 601 and the antenna 602, a synchronization signal, a reference signal, or a broadcast message carrying the RTA information of the base station.

In some embodiments of the present disclosure, the processor 604 may also initiate, through the transceiver 601 and the antenna 602, in the case that a paging for the first terminal needs to be initiated, initiate the paging within a RTA corresponding to the RTA information to which the first terminal belongs.

In addition, the processor 604 may further configured to, in the case that the resident base station serves as an anchor base station of a second terminal and detects that the second terminal is in a radio resource control RRC idle state or an inactive connection state, configure corresponding RTA information for the second terminal based on preset attribute information of the second terminal and send the corresponding RTA information to the second terminal through the transceiver 601 and the antenna 602, and update the RTA information to which the second terminal belongs based on the corresponding RTA information configured for the second terminal.

In addition, the processor 604 may further configured to, in the case that the resident base station detects that the second terminal is in the radio resource control RRC idle state or the inactive connection state, determine a RTA update period for initiating the RAT update periodically for the second terminal and configure the RTA update period for the second terminal through the transceiver 601 and the antenna 602.

Figure 7:
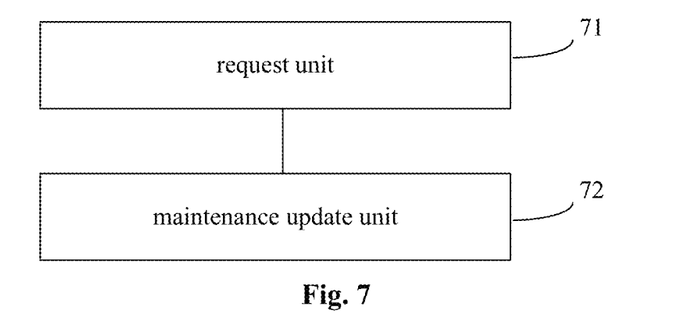
FIG. 7 is a schematic view of a terminal in some embodiments of the present disclosure.

Referring to FIG. 7, a terminal is further provided in some embodiments of the present disclosure, including:

a request unit 71, configured to, in the case that the terminal is in a radio resource control RRC idle state or an inactive connection state, send to a resident base station where the terminal resides, a radio access network tracking area RTA update request carrying information of an anchor base station of the terminal; and a maintenance update unit 72, configured to receive a RTA update acknowledgement message returned by the resident base station and update RTA information to which the terminal belongs.

In some embodiments of the present disclosure, the terminal may further include:

a trigger unit, configured to trigger the request unit to send the RTA update request carrying the information of the anchor base station of the terminal to the resident base station, in the case of reaching a preset RTA update period or determining that the RTA may be updated.

Specifically, the trigger unit further includes: determination unit configured to parse a synchronization signal, a reference signal or a broadcast message sent by the resident base station and received by the terminal, to acquire RTA information of the resident base station carried by the synchronization signal, the reference signal or the broadcast message; determine whether the RTA information of the resident base station matches RTA information to which the terminal currently belongs, and determine that the RTA may be updated in the case that the RTA information of the resident base station does not match the RTA information to which the terminal currently belongs; or receive RTA information configured by the resident base station for the terminal, determine whether the RTA information configured for the terminal matches RTA information to which the terminal currently belongs, and determine that the RTA may be updated in the case that the RTA information configured for the terminal does not match the RTA information to which the terminal currently belongs.

In some embodiments of the present disclosure, the maintenance update unit may include:

a first update unit, configured to parse a synchronization signal, a reference signal or a broadcast message sent by the resident base station and received by the terminal, to acquire RTA information of the resident base station carried by the synchronization signal, the reference signal or the broadcast message, and update the RTA information to which the terminal belongs based on the RTA information of the resident base station;

a first acquisition unit, configured to, in the case that the terminal is in the RRC idle state or the inactive connection state, receive the synchronization signal, the reference signal, or the broadcast message sent by the resident base station, parse the synchronization signal, the reference signal, or the broadcast message to acquire the RTA information of the resident base station carried by the synchronization signal, the reference signal or the broadcast message, and store the RTA information of the resident base station as the RTA information to which the terminal belongs.

In some embodiments of the present disclosure, the maintenance update unit may include:

a second update unit, configured to parse the RTA update acknowledgement message, and acquire RTA information carried by the RTA update acknowledgement message and configured by the resident base station for the terminal, and update the RTA information to which the terminal belongs based on the RTA information configured by the resident base station;

a second acquisition unit, configured to, in the case that the terminal is in the RRC idle state or the inactive connection state, receive the RTA information configured by the resident base station for the terminal, acquire the RTA information to which the terminal belongs based on the RTA information configured by the resident base station, and save the RTA information.

During the RTAU process, the anchor base station of the terminal may be updated, so the maintenance update unit may further include: an anchor update unit, configured to parse the RTA update acknowledgement message, acquire indication information of a new anchor base station of the terminal carried by the RTA update acknowledgement message, and update the information of the anchor base station of the terminal maintained by the terminal based on the indication information of the new anchor base station of the terminal.

Figure 8:
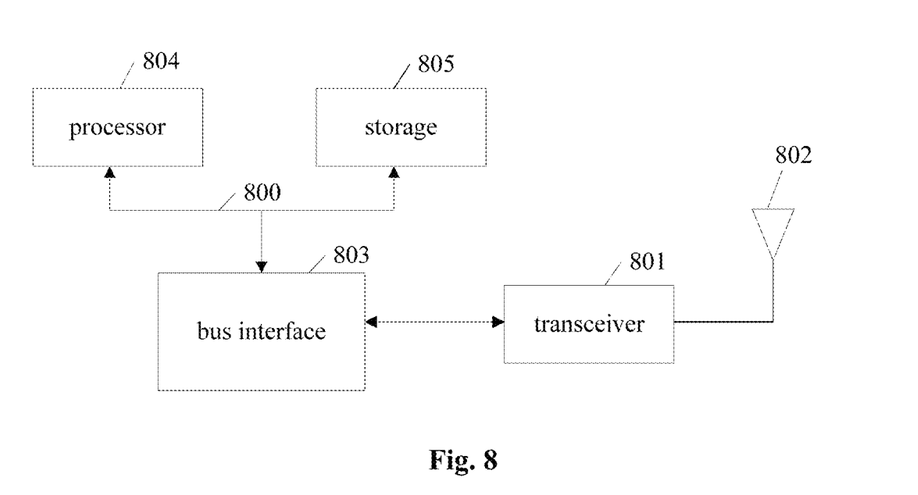
FIG. 8 is another schematic view of a terminal in some embodiments of the present disclosure.

Referring to FIG. 8, a terminal is further provided in some embodiments of the present disclosure, including:

a transceiver 801, configured to receive and transmit data under the control of the processor 804, and specifically, configured to send to a resident base station where the terminal resides, a radio access network tracking area RTA update request carrying information of an anchor base station of the terminal, and receive a RTA update acknowledgement message returned by the resident base station.

a processor 804, configured to read a program in the storage 805 to:

when the terminal is in the RRC idle state or the inactive connection state, generate a RTA update request carrying information of the anchor base station of the terminal, send the RTA update request to the resident base station through the transceiver 801 and the antenna 802, update the RTA information to which the terminal belongs according to the RTA update acknowledgement message received by the transceiver 801.

In FIG. 8, the bus architecture (represented by bus 800) may include any number of interconnected buses and bridges, which may connect various circuits of one or more processors represented by processor 804 and the storage represented by storage 805. The bus 800 can also connect various other circuits, such as peripherals, voltage regulators, and power management circuits, as is known in the art, and therefore will not be further described herein. The second bus interface 803 provides an interface between bus 800 and transceiver 801. The transceiver 801 may be an element or a plurality of elements, such as multiple receivers and transmitters, providing units for communicating with various other devices on a transmission medium. Data processed by the processor 804 is transmitted over the wireless medium by the transceiver 801 and the antenna 802. Further, the antenna 802 also receives the data and transmits the data to the processor 804 via the transceiver 801.

The processor 804 is configured to manage the bus 800 and the usual processing, and may also provide various functions including timing, peripheral interfaces, voltage regulation, power management, and other control functions. The storage 805 is configured to store data used by the processor 804 when performing operations. Specifically, the processor 804 may be a CPU, an ASIC, an FPGA, or a CPLD.

In some embodiments of the present disclosure, the processor 804 may perform a periodic timing of the preset RTA update period, and control the transceiver 801 and the antenna 802 to send the RTA update request when the RTA update period is reached or when it is determined that the RTA may be updated.

In addition, the transceiver 801 may also receive a synchronization signal, a reference signal, or a broadcast message transmitted by the resident base station.

Specifically, the processor 804 may determine that the RTA may be updated according to the following manner: parsing a synchronization signal, a reference signal or a broadcast message sent by the resident base station and received by the transceiver 801, to acquire RTA information of the resident base station carried by the synchronization signal, the reference signal or the broadcast message; determining whether the RTA information of the resident base station matches RTA information to which the terminal currently belongs, and determining that the RTA may be updated in the case that the RTA information of the resident base station does not match the RTA information to which the terminal currently belongs; or receiving, through the transceiver 801 and the antenna 802, RTA information configured by the resident base station for the terminal, determining whether the RTA information configured for the terminal matches RTA information to which the terminal currently belongs, and determining that the RTA may be updated in the case that the RTA information configured for the terminal does not match the RTA information to which the terminal currently belongs.

The processor 804 may also parse the synchronization signal, the reference signal, or the broadcast message received by the transceiver 801, obtain the RTA information of the base station carried therein, and update the RTA information to which the terminal belongs according to the RTA information of the base station.

In addition, the processor 804 may, in the case that the terminal is in the RRC idle state or the inactive connection state, parse the synchronization signal, the reference signal, or the broadcast message received by the transceiver 801 to acquire the RTA information of the resident base station carried by the synchronization signal, the reference signal or the broadcast message, and store the RTA information of the resident base station as the RTA information to which the terminal belongs.

The RTA update acknowledgement message sent by the resident base station may carry the RTA information configured by the resident base station for the terminal. In this case, the processor 804 may parse the RTA update acknowledgement message, acquire RTA information carried by the RTA update acknowledgement message and configured by the resident base station for the terminal, and update the RTA information to which the terminal belongs based on the RTA information configured by the resident base station.

The resident base station may dynamically configure the RTA information for each terminal. In this case, the processor 804 may, in the case that the terminal is in the RRC idle state or the inactive connection state, acquire the RTA information to which the terminal belongs based on the received RTA information configured by the resident base station, and save the RTA information.

In addition, the resident base station may carry the indication information of the new anchor base station of the terminal in the RTA update acknowledgement message, and the processor 804 may parse the RTA update acknowledgement message, acquire indication information of a new anchor base station of the terminal carried by the RTA update acknowledgement message, and update the information of the anchor base station of the terminal maintained by the terminal based on the indication information of the new anchor base station of the terminal.

The method flow and device structure in embodiments of the present disclosure are described above from the perspective of the base station and the terminal side, respectively. The present disclosure will be further described below in conjunction with an overall flowchart of a plurality of application scenarios.

Application scenario 1: a RTAU process in an inter-RTA and intra-eNB scenario, a base station configures a RTA statically.

Figure 9:
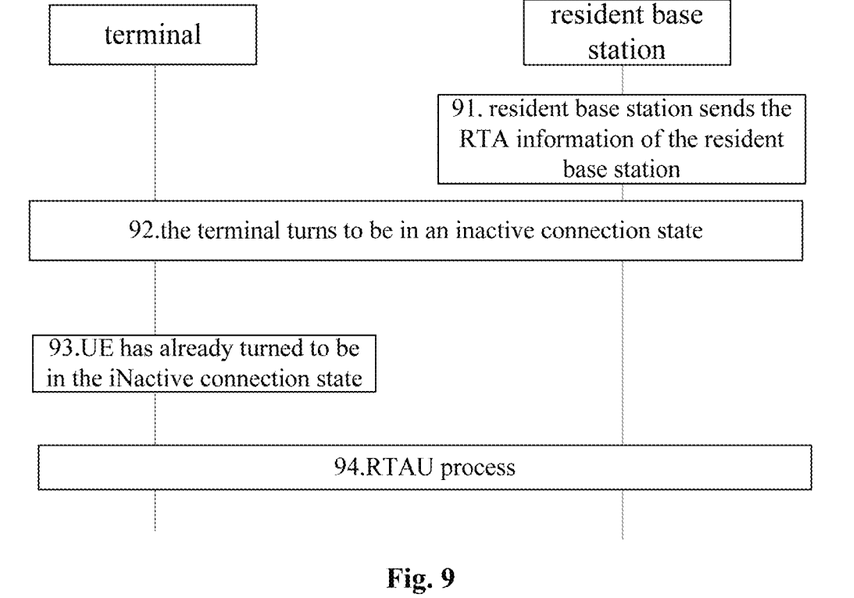
FIG. 9 is an overall flowchart of a method for managing a wireless system area in some embodiments of the present disclosure.

As shown in FIG. 9, the scenario is related to an RTAU process caused by the movement of the terminal in the base station. In this scenario, the resident base station is also the anchor base station of the terminal. In addition, in this scenario, the RTA is statically configured.

In Step 91, the resident base station may carry the RTA information of the resident base station, such as SIA/Cell ID information, through a synchronization signal, a reference signal or a broadcast message, or carry the RTA ID information through a synchronization signal, a reference signal or a broadcast message based on a mapping relationship between the SIA/Cell ID and the RTA ID configured by the OAM, where multiple SIAs/Cell IDs may be mapped onto one RTA ID.

In Step 92, the terminal may turn to be in an inactive connection state (Inactive state) under the control of the network side. In the process of turning to be in the inactive connection state, the terminal may receive the RTA information of the resident base station carried by resident base station in a synchronization signal, a reference signal, or a broadcast message, and then the RTA information is saved as the RTA information to which the terminal belongs.

In Step 93, the terminal has already turned to be in the inactive connection state, that is, in the inactive connection state. Thereafter, if the terminal moves to the new RTA under the resident base station, and detects that the SIA or cell ID or RTA ID sent by the resident base station in the new RTA is different from that of the RTA where the terminal resides previously (i.e., different from the RTA information to which the terminal currently belongs), the RTAU process needs to be initiated.

In Step 94, the terminal sends through the radio interface an RTAU request through a signaling. After receiving the signaling from the radio interface of the terminal, the resident base station determines that the base station is the anchor base station of the terminal (having a dedicated connection with the terminal and the core network node), terminates the signaling, and does not send any signaling to the core network. At the same time, the anchor base station determines and stores the latest RTA information to which the terminal belongs according to the cell accessed by the terminal, to locate the RTA of the terminal when the downlink data/signal arrives. The resident base station also returns an RTAU acknowledgement message to the terminal. After receiving the message, the terminal also locally updates the latest RTA information, that is, the RAT information is updated to the RTA information of the resident base station sent by the resident base station through the synchronization signal, the reference signal or the broadcast message in the current access cell.

Application scenario 2: a RTAU process in an intra-eNB and inter-RTA scenario, RTA is dynamically configured for terminal.

Figure 10:
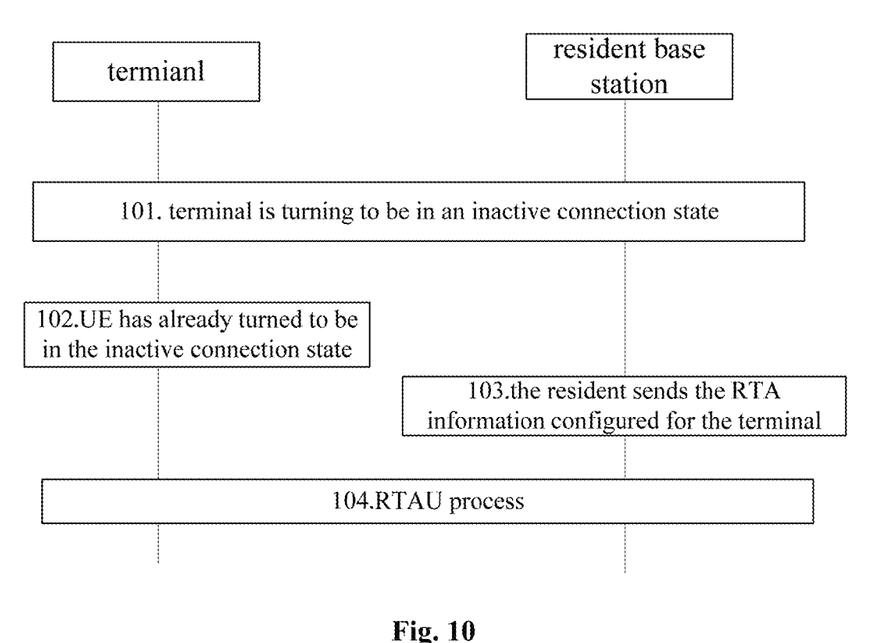
FIG. 10 is another overall flowchart of a method for managing a wireless system area in some embodiments of the present disclosure.

As shown in FIG. 10, the scenario is related to an RTAU process caused by the movement of the terminal in the base station. In this scenario, the resident base station is also the anchor base station of the terminal. In addition, in this scenario, the RTA is dynamically configured by the base station for each terminal.

In Step 101, the terminal may turn to be in an inactive connection state (Inactive state) under the control of the network side. In the process of turning to be in the inactive connection state, the resident base station configures the corresponding RTA information for the terminal according to the attribute information of the terminal, and the terminal acquires and saves the RTA information to which the terminal belongs.

In Steps 102-103, the terminal has turned to be in the inactive connection state, that is, in the inactive connection state. Thereafter, if the terminal moves to the new RTA under the resident base station, the resident base station may reconfigure RTA information for the terminal, when the reconfigured RTA The information is different from the RTA information to which the terminal currently belongs, the RTAU process needs to be initiated.

In Step 104, the terminal sends through the radio interface a RTAU request by a signaling. After receiving the signaling from the radio interface of the terminal, the resident base station determines that the base station is the anchor base station of the terminal (having a dedicated connection of the terminal with the core network node), terminates the signaling, and does not send any signaling to the core network. At the same time, the anchor base station reconfigures the RTA information for the terminal according to the preset attribute information of the terminal, and sends the RTA information to the terminal through the radio interface, for example, the RTA information is carried in the RTAU confirmation message and sent to the terminal. After receiving the message, the terminal acquires the RTA information carried therein, and updates the latest RTA information locally according to the RTA information.

Application scenario 3: a RTAU process in an inter-eNB and inter-RTA scenario, RTA is statically configured.

Figure 11:
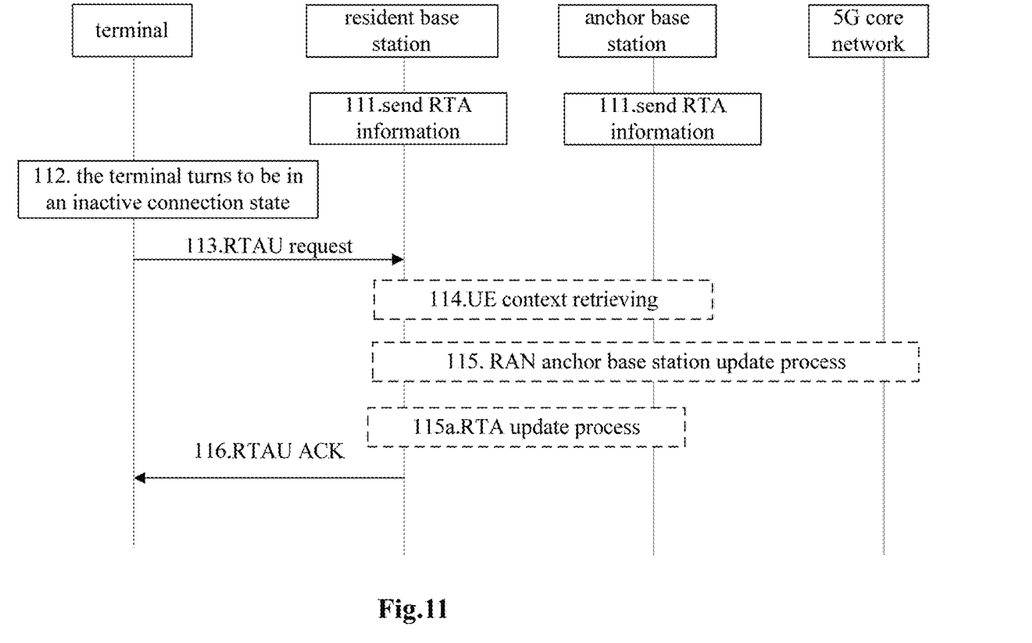
FIG. 11 is another overall flowchart of a method for managing a wireless system area in some embodiments of the present disclosure.

As shown in FIG. 11, the scenario is related to an RTAU process caused by the movement of the terminal between the base stations. In this scenario, the resident base station is not the anchor base station of the terminal. In addition, in this scenario, the RTA is statically configured.

In Step 111, each base station (including the resident base station and the anchor base station) may carry the RTA information of the resident base station, such as SIA/Cell ID information, through a synchronization signal, a reference signal or a broadcast message, or carry the RTA ID information through a synchronization signal, a reference signal or a broadcast message based on a mapping relationship between the SIA/Cell ID and the RTA ID configured by the OAM, where multiple SIAs/Cell IDs may be mapped onto one RTA ID.

In Step 112, the terminal may turn to be in an inactive connection state (Inactive state) under the control of the network side. Assuming that the terminal resides at the anchor base station, in the process of turning to be in the inactive connection state, the terminal may receive the RTA information of the resident base station carried by resident base station in a synchronization signal, a reference signal, or a broadcast message, and then the RTA information is saved as the RTA information to which the terminal belongs.

In Step 113, the terminal moves between the base stations and moves from the anchor base station to the resident base station, and resides at the resident base station through a cell reselection procedure. In this case, the terminal may detect that the SIA or the cell ID or the RTA ID sent by the resident base station is different from the RTA information to which the terminal currently belongs, and then the RTAU process needs to be initiated to send the RTAU request to the resident base station.

Here, after receiving the RTAU request, the resident base station determines that the base station is not the anchor base station of the terminal, there are two processing methods:

Processing method 1: In Steps 114-115, the resident base station updates the RTA information to which the terminal belongs, that is, updates the RTA information of the resident base station to the RTA information to which the terminal belongs, and initiates a terminal context retrieving process to the anchor base station, to request the anchor base station to acquire a terminal context; and after obtaining the terminal context, the resident base station initiates a RAN anchor base station update process to the core network, and update the anchor base station of the terminal to the resident base station.

Processing 2: In Step 115*a*, the resident base station updates the RTA information to which the terminal belongs, that is, updates the RTA information of the resident base station to the RTA information to which the terminal belongs, and initiates a RTA update process of the terminal to the anchor base station, to send the RTA information to which the terminal belongs to the anchor base station, so that the anchor base station updates the RTA information to which the terminal belongs in the terminal context.

After the process methods 1 or 2, in Step 116, the resident base station returns an RTAU acknowledgment (RTAU ACK) message to the terminal. After receiving the message, the terminal also locally updates the latest RTA information, that is, updates to the RTA information of the base station that the base station transmits in the current access cell through a synchronization signal, a reference signal, or a broadcast message.

Application scenario 4: a RTAU process in an inter-eNB and inter-RTA scenario, the RTA is dynamically configured for the terminal.

Figure 12:
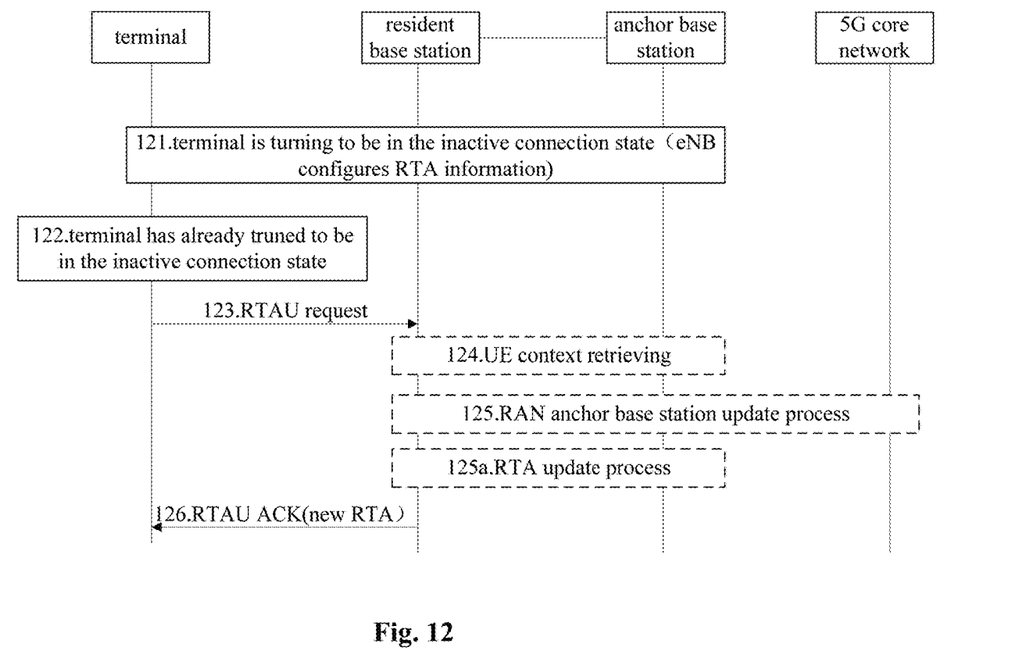
FIG. 12 is another overall flowchart of a method for managing a wireless system area in some embodiments of the present disclosure.

As shown in FIG. 12, the scenario is related to an RTAU process caused by a terminal moving between base stations. In this scenario, the resident base station is not an anchor base station of the terminal. In addition, in this scenario, the RTA is dynamically configured by the base station for each terminal.

In Step 121, the terminal resides at the anchor base station, and the terminal turns to be in the inactive connection state under the control of the network side. During the process of turning to be in the inactive connection state, the base station configures, through a dedicated signaling, the RTA information of the terminal based on the specific attribute information of the terminal such as the terminal moving speed. The RTA information may include a SIA list or a cell list or an RTA ID list. The terminal needs to save the configuration information, and locally maintains the RTA information to which the terminal belongs according to the configuration information.

In Step 122, the terminal has turned to be in the inactive connection state, then the terminal moves between the base stations and moves from the anchor base station to the resident base station, and resides at the resident base station through a cell reselection process. The resident base station may configure the RTA information for the terminal. In this case, the terminal may detect that the RTA information configured by the resident base station is different from the RTA information to which the terminal currently belongs, and then a RTAU process needs to be initiated.

In Step 123, the terminal sends an RTAU request message to the resident base station, and the RTAU request message carries information such as an anchor base station of the terminal.

Here, when the resident base station determines that the base station is not the anchor base station of the terminal after receiving the RTAU request, there are two processing methods:

Processing method 1: In Steps 124-125, the resident base station reconfigures the RTA information for the terminal according to the specific attribute of the terminal, and updates the RTA information to which the terminal belongs according to the configured RTA information, that is, the RTA information configured by the resident base station is updated to the RTA information to which the terminal belongs, and initiates a terminal context retrieving process to the anchor base station, to request the anchor base station to acquire a terminal context. After obtaining the terminal context, the resident base station initiates a RAN anchor base station update process to the core network, to update the anchor base station of the terminal to the resident base station.

Processing method 2: in Step 125a, the resident base station reconfigures the RTA information for the terminal according to the specific attribute of the terminal, and updates the RTA information to which the terminal belongs according to the configured RTA information, that is, the RTA information configured by the resident base station is updated to the RTA information to which the terminal belongs, and initiates a RTA update process of the terminal to the anchor base station, and the RTA information to which the terminal belongs is sent to the anchor base station, so that the anchor base station may update the RTA information to which the terminal belongs in the terminal context.

After the processing methods 1 or 2, in Step 126, the resident base station returns an RTAU acknowledgment (RTAU ACK) message to the terminal, the message may carry the RTA information reconfigured by the resident base station for the terminal. After receiving the message, the terminal also updates the latest RTA information locally, that is, the RTA information to which the terminal belongs is updated to the RTA information reconfigured by the residing base station which is carried in the RTAU confirmation message.

Application scenario 5: the terminal periodically performs the RTAU process.

In the foregoing application scenarios 1 to 4, the resident base station may configure the RTAU periodic timer for the terminal during the process of the terminal turning to be in the inactive connection state or during the initial access of the terminal to the network. The terminal initiates a periodic RTAU process when the timing period of the RTAU periodic timer is reached. The process of initiating the RTAU by the terminal is similar to the description in the application scenarios 1 to 4 mentioned above, so the detailed description thereof is omitted herein.

It should be noted that the foregoing scenario is described by using a terminal in an inactive connection state as an example. The foregoing scenario is also applicable to a terminal in an RRC idle state.

In summary, according to the method and device for wireless area management in the embodiments of the present disclosure, a new location management area for the terminal in an inactive connection state/RRC idle state is defined. The process of moving among different nodes in the area is simplified, the signaling load for the core network is reduced, the paging area at the RAN side is reduced, the system efficiency is improved, and the user experience is improved.

The above are some embodiments of the present disclosure, and it should be noted that those skilled in the art can also make several improvements and modifications without departing from the principle of the present disclosure, which may also fall into the scope of the present disclosure.

What is claimed is:

1. A method for managing a wireless system area, comprising:
    receiving, by a resident base station where a first terminal resides, a radio access network tracking area (RTA) update request sent by the first terminal and carrying information of an anchor base station of the first terminal;
    determining, by the resident base station, whether the resident base station is the anchor base station of the first terminal, based on the information of the anchor base station of the first terminal carried in the RTA update request; and
    configuring, by the resident base station where a second terminal resides, in the case that the resident base station serves as an anchor base station of the second terminal and detects that the second terminal is in a radio resource control RRC idle state or an inactive connection state, corresponding RTA information for the second terminal based on preset attribute information of the second terminal and sending the corresponding RTA information to the second terminal, and updating the RTA information to which the second terminal belongs based on the corresponding RTA information configured for the second terminal;
    wherein the method further comprises:
    determining, by the resident base station, in the case that the resident base station detects that the second terminal is in the radio resource control RRC idle state or the inactive connection state, a RTA update period for initiating the RAT update periodically for the second terminal and configuring the RTA update period for the second terminal.

2. The method according to claim 1, wherein,
    in the case that the resident base station determines that the resident base station is the anchor base station of the first terminal, the method further comprises:
        updating, by the resident base station, RTA information to which the first terminal belongs, and sending, by the resident base station, a RTA update acknowledgement message to the first terminal, in the case that the resident base station determines that the resident base station is the anchor base station of the first terminal;
    in the case that the resident base station determines that the resident base station is not the anchor base station of the first terminal, the method further comprises:
        acquiring context information of the first terminal from the anchor base station, initiating a RAN anchor base station update to a core network node, and updating the anchor base station of the first terminal to the resident base station; and
        updating the RTA information to which the first terminal belongs, and sending the RTA update acknowledgement message to the first terminal;
    or,
        updating the RTA information to which the first terminal belongs in the case that the resident base station determines that the resident base station is not the anchor base station of the first terminal;
        sending, by the resident base station, the RTA information to which the first terminal belongs to the anchor base station, to update context information of the first terminal maintained by the anchor base station; and
        sending, by the resident base station, the RTA update acknowledgement message to the first terminal.

3. The method according to claim 2, wherein the updating the RTA information to which the first terminal belongs further comprises:
    determining, by the resident base station, an access cell of the first terminal, and updating, by the resident base station, the RTA information to which the first terminal belongs based on a RTA corresponding to the access cell; or
    the updating the RTA information to which the first terminal belongs further comprises:

configuring, by the resident base station, corresponding RTA information for the first terminal based on preset attribute information of the first terminal, and updating the RTA information to which the first terminal belongs based on the corresponding RTA information configured for the first terminal; and the sending the RTA update acknowledgement message to the first terminal further comprises: sending to the first terminal the RTA update acknowledgement message carrying the corresponding RTA information configured for the first terminal.

4. The method according to claim 2, wherein subsequent to the sending the RTA update acknowledgement message to the first terminal, the method further comprises:

initiating, by the resident base station, in the case that the resident base station needs to initiate a paging for the first terminal, the paging within a RTA corresponding to the RTA information to which the first terminal belongs.

5. The method according to claim 1, further comprising:

sending, by the resident base station, a synchronization signal, a reference signal or a broadcast message carrying the RTA information of the resident base station.

6. A resident base station, comprising: a processor, a transceiver and a storage, wherein the processor is configured to read a program stored in the storage to perform the method for managing a wireless system area according to claim 1.

* * * * *